United States Patent
Abraham et al.

(10) Patent No.: US 10,334,422 B2
(45) Date of Patent: Jun. 25, 2019

(54) METHODS AND APPARATUS FOR WIRELESS DISCOVERY LOCATION AND RANGING WITHIN A NEIGHBORHOOD AWARE NETWORK

(71) Applicant: QUALCOMM Incorporated, San Diego, CA (US)

(72) Inventors: Santosh Paul Abraham, San Diego, CA (US); Alireza Raissinia, Monte Sereno, CA (US); Carlos Horacio Aldana, Mountain View, CA (US); Abhishek Pramod Patil, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 15/172,088

(22) Filed: Jun. 2, 2016

(65) Prior Publication Data
US 2016/0366578 A1 Dec. 15, 2016

Related U.S. Application Data

(60) Provisional application No. 62/175,598, filed on Jun. 15, 2015, provisional application No. 62/199,123, filed on Jul. 30, 2015.

(51) Int. Cl.
*H04W 4/02* (2018.01)
*H04W 8/00* (2009.01)
(Continued)

(52) U.S. Cl.
CPC ......... *H04W 8/005* (2013.01); *H04L 67/1068* (2013.01); *H04L 67/16* (2013.01);
(Continued)

(58) Field of Classification Search
CPC ..... H04W 8/005; H04W 4/025; H04W 84/12; H04L 67/16
See application file for complete search history.

(56) References Cited

U.S. PATENT DOCUMENTS

| 2014/0302786 A1* | 10/2014 | Kasslin | H04W 8/005 |
| | | | 455/41.2 |
| 2015/0350936 A1* | 12/2015 | Qi | H04W 24/02 |
| | | | 370/252 |
| 2016/0014565 A1* | 1/2016 | Segev | H04W 4/025 |
| | | | 455/456.1 |

FOREIGN PATENT DOCUMENTS

| WO | WO-2014109874 A1 | 7/2014 |
| WO | WO-2015073969 A1 | 5/2015 |

OTHER PUBLICATIONS

Aldana et al., Location Related Corrections to Draft 3.0, Jul. 2014. (Year: 2014).*

(Continued)

*Primary Examiner* — Oussama Roudani
(74) *Attorney, Agent, or Firm* — Paradice and Li LLP

(57) ABSTRACT

Methods and apparatus for wireless communication in a peer-to-peer network are described herein. In one aspect, a method of wireless communication apparatus is provided. The method includes transmitting during a discovery window, by a first device, a first service discovery frame (SDF) or other action frame to a second device, the first SDF or other action frame comprising ranging information for performing a ranging protocol. The method further includes performing the ranging protocol, by the first device, in accordance with the ranging information.

39 Claims, 13 Drawing Sheets

(51) Int. Cl.
　　　*H04L 29/06*　　　(2006.01)
　　　*H04L 29/08*　　　(2006.01)
　　　*H04W 28/18*　　　(2009.01)
　　　*H04W 84/12*　　　(2009.01)
　　　*H04W 84/18*　　　(2009.01)

(52) U.S. Cl.
　　　CPC ............ *H04L 69/28* (2013.01); *H04W 4/025* (2013.01); *H04W 28/18* (2013.01); *H04W 84/12* (2013.01); *H04W 84/18* (2013.01)

(56) References Cited

OTHER PUBLICATIONS

Aldana C. et al., "Location Related Corrections to Draft 3.0; 11-14-0933-02-000m-location-related-corrections-to-draft-3-0", IEEE Draft; 11-14-0933-02-000M-Location-Related-Corrections-to-DRAFT-3-0, IEEE-SA Mentor, Piscataway, NJ USA, vol. 802.11m, No. 1, Jul. 17, 2014 (Jul. 16, 2014), pp. 1-16, XP068070651.
International Search Report and Written Opinion—PCT/US2016/035754—ISA/EPO—dated Sep. 20, 2016.

* cited by examiner

| Field | Size (Octets) | Value (Hex) | Description |
|---|---|---|---|
| Attribute ID | 1 | 0x03 | Identifies the type of NAN attribute |
| Length | 2 | Var | Length of the following fields in the attribute |
| MAC Address | 6 | Var | Device MAC address for execution of ranging protocol |
| Map Control | 1 | Var | The availability channel and time map control information |
| Ranging Control | 1 | Var | Used for indication ranging parameters |
| FTM Parameters | 3 | Var | Structured as in FTM Parameters Element |
| Availability Intervals Bitmap | Var | Var | The Availability Intervals Bitmap divides the time between the beginnings of consecutive Discovery Windows of a given NAN cluster into consecutive time intervals of equal durations. The time interval duration is specified by the Availability Interval Duration |

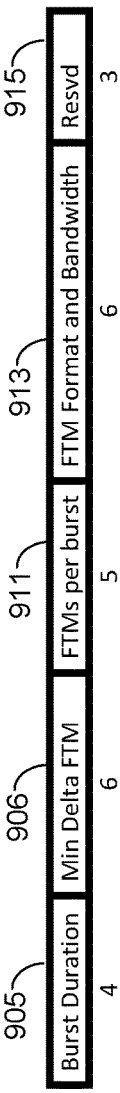

| Field | Size (Octets) | Value (Hex) | Description |
|---|---|---|---|
| Attribute ID | 1 | 0x03 | Identifies the type of NAN attribute |
| Length | 2 | Var | Length of the following fields in the attribute |
| MAC Address | 6 | Var | Device MAC address for execution of ranging protocol |
| Ranging Control | 2 | Var | Used for indication ranging parameters |
| FTM Parameters | 3 | Var | Structured as in FTM Parameters Element |
| Service Map | 1 | Var | Bit map: When present and the nth bit is set, indicates that ranging is mandatory of the service in the nth SDA listed in the SDF When absent indicates that device requests ranging independent of the services |
| Last Move Indication | 2 | Var | The value of a cluster TSF at the last detected platform movement. |
| Map Control | 1 | Var | The availability channel and time map control information |
| Availability Intervals Bitmap | Var | Var | The Availability Intervals Bitmap divides the time between the beginnings of consecutive Discovery Windows of a given NAN cluster into consecutive time intervals of equal durations. The time interval duration is specified by the Availability Interval Duration |

FIG. 10

METHODS AND APPARATUS FOR WIRELESS DISCOVERY LOCATION AND RANGING WITHIN A NEIGHBORHOOD AWARE NETWORK

CROSS REFERENCE TO RELATED APPLICATIONS

This application claims priority benefit under 35 U.S.C. § 119(e) to U.S. Provisional Patent Application No. 62/175,598 entitled "METHODS AND APPARATUS FOR WIRELESS DISCOVERY LOCATION AND RANGING WITHIN A NEIGHBORHOOD AWARE NETWORK" filed on Jun. 15, 2015, and U.S. Provisional Patent Application No. 62/199,123 entitled "METHODS AND APPARATUS FOR WIRELESS DISCOVERY LOCATION AND RANGING WITHIN A NEIGHBORHOOD AWARE NETWORK" filed on Jul. 30, 2015, the disclosure of which is hereby incorporated by reference in its entirety.

FIELD

The present application relates generally to wireless communications, and more specifically to systems, methods, and devices for discovery and ranging in a peer-to-peer wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), a neighborhood aware network (NAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. To carry out various communications, the devices can coordinate according to a protocol. As such, devices can exchange information to coordinate their activities. Improved systems, methods, and devices for coordinating transmitting and sending communications within a wireless network are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method of wireless communication. The method includes transmitting during a discovery window, by a first device, a first service discovery frame (SDF) or other action frame to a second device, the first SDF or other action frame comprising ranging information for performing a ranging protocol. The method further includes performing the ranging protocol, by the first device, in accordance with the ranging information.

Another aspect of the disclosure provides a method of wireless communication. The method includes receiving during a discovery window, at a first device, a first service discovery frame (SDF) or other action frame from a second device, the first SDF or other action frame comprising ranging information. The method further includes transmitting during the discovery window, by the first device, a second SDF or other action frame to the first device in response to the first SDF or other action frame, the second SDF or other action frame comprising ranging information and an indication of a time period outside the discovery window for performing a ranging protocol in accordance with the ranging information. The method further includes performing the ranging protocol, by the first device, during the time period indicated in the second SDF or other action frame.

Another aspect provides an apparatus configured to wirelessly communicate. The apparatus includes a transmitter configured to transmit during a discovery window, a first service discovery frame (SDF) or other action frame to a second device, the first SDF or other action frame comprising ranging information for performing a ranging protocol. The apparatus further comprising a processor configured to perform the ranging protocol in accordance with the ranging information.

Another aspect provides an apparatus configured to wirelessly communicate. The apparatus includes a receiver configured to receive during a discovery window, a first service discovery frame (SDF) or other action frame from a second device, the first SDF or other action frame comprising ranging information. The apparatus includes a transmitter configured to transmit during the discovery window, a second service discovery frame (SDF) or other action frame to the second device, the second SDF or other action frame comprising ranging information and an indication of a time period outside the discovery window for performing a ranging protocol in accordance with the ranging information. The apparatus further comprising a processor configured to perform the ranging protocol during the time period indicated in the second SDF or other action frame.

Another aspect provides another apparatus for wireless communication. The apparatus includes means for transmitting during a discovery window, by a first device, a first service discovery frame (SDF) or other action frame to a second device, the first SDF or other action frame comprising ranging information for performing a ranging protocol. The apparatus further includes means for performing the ranging protocol, by the first device, during the time period indicated in the first SDF or other action frame.

Another aspect provides another apparatus for wireless communication. The apparatus includes means for receiving during a discovery window, at a first device, a first service discovery frame (SDF) or other action frame from a second device, the first SDF or other action frame comprising ranging information. The apparatus further includes means for transmitting during a discovery window, by the first device, a second service discovery frame (SDF) or other action frame to a second device, the second SDF or other action frame comprising ranging information and an indication of a time period outside the discovery window for performing a ranging protocol in accordance with the ranging information. The apparatus further includes means for performing the ranging protocol, by the first device, during the time period indicated in the second SDF or other action frame.

Another aspect provides a non-transitory computer-readable medium. The medium includes code that, when executed, causes an apparatus to perform a method. The method includes transmitting during a discovery window, by a first device, a first service discovery frame (SDF) or other action frame to a second device, the first SDF or other action frame comprising ranging information for performing a ranging protocol. The method further includes performing the ranging protocol, by the first device, in accordance with the ranging information.

Another aspect provides a non-transitory computer-readable medium. The medium includes code that, when executed, causes an apparatus to perform a method. The method includes receiving during a discovery window, at a first device, a first service discovery frame (SDF) or other action frame from a second device, the first SDF or other action frame comprising ranging information. The method further includes transmitting during the discovery window, by the first device, a second SDF or other action frame to the first device in response to the first SDF or other action frame, the second SDF or other action frame comprising ranging information and an indication of a time period outside the discovery window for performing a ranging protocol in accordance with the ranging information. The method further includes performing the ranging protocol, by the first device, during the time period indicated in the second SDF or other action frame.

BRIEF DESCRIPTION OF THE DRAWINGS

FIG. 8 is a chart that illustrates another exemplary format of a ranging setup attribute (RSA), in accordance with an exemplary embodiment.

FIG. 9 illustrates another exemplary structure of a FTM parameters field of a RSA.

FIG. 10 is a chart that illustrates another exemplary format of a ranging setup attribute (RSA), in accordance with an exemplary embodiment.

DETAILED DESCRIPTION

Figure 1:
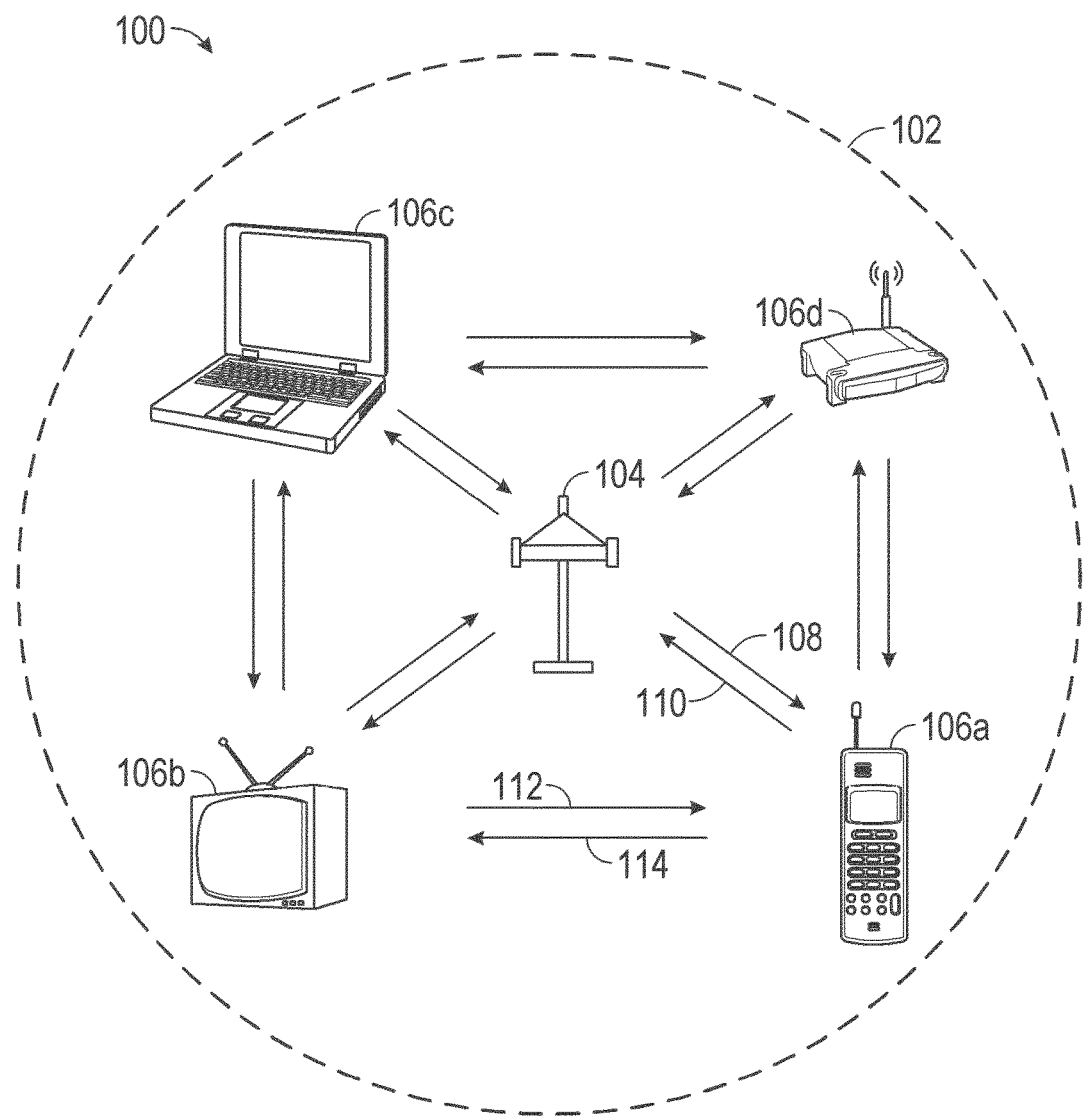
FIG. 1 illustrates an example of a wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, node, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices, such as a group of stations, for example, may be used for neighborhood aware networking, or social-WiFi networking. For example, various stations within the network may communicate on a device to device (e.g., peer-to-peer communications) basis with one another regarding applications that each of the stations support. Wireless network technologies for social-WiFi networking may include various types of WLANs and near-area, (or near-me area) networks (NANs). A NAN may be used to connect nearby devices together, employing certain networking protocols. The wireless devices in a NAN can belong to different proprietary network infrastructures (for example, different mobile carriers). So, even though two devices are geographically close, the communication path between them might, in fact, traverse a long distance, going from a LAN, through the Internet, and to another LAN. NAN applications focus on two-way communications among people within a certain proximity to each other, but don't generally concern themselves with those people's exact locations. Some services are meaningful only to a group of people in close proximity, which has generated the need for NANs. Some non-limiting examples of NAN uses are illustrated in the following scenarios:

Allie is going to the supermarket to buy three bottles of red wine. The supermarket offers a 30 percent discount on the purchase of six bottles, so she sends a message to other customers to see if they would like to buy the other three bottles of wine.

Elissa bought a movie ticket 15 minutes ago, but she now feels dizzy and can't watch the film. She sends out messages to people around the cinema to see if anyone will purchase her ticket at 50 percent off In a theme park, guests would like to know each ride's queue status to reduce their waiting time. So, they take a photo of the queue they're in and share it with other guests through a NAN application.

Marcy works in Del Mar and would like to find someone to have lunch with. She checks her friend list to see who is closest to her at this moment and invites that friend to join her.

Paige just lost her son in the street, so she sends out his picture, which is stored in her mobile device, to near passers-by to see if they can find him. Katie, half-a-block away from Paige, finds Paige's son using the picture she received on her smart phone, and contacts Paige to tell her where to find him.

Accordingly, it can be desirable for a discovery protocol used in a social-WiFi network to enable STAs to advertise themselves (e.g., by sending discovery packets or messages) as well as discover services provided by other STAs (e.g., by sending paging or query packets or messages), while ensuring secure communication and/or low power consumption. Further, it may be desirable for a discovery protocol that enables a STA to transmit service specific information (e.g., ticket information, a picture, etc.) to other STAs.

One or more STAs or nodes of a NAN can transmit synchronization messages to coordinate one or more availability windows for communication between nodes of the peer-to-peer network. The nodes can also exchange discovery queries and responses to provide for service discovery between devices operating within the same peer-to-peer or neighborhood aware network. A NAN can be considered a peer-to-peer network or an ad-hoc network in some aspects.

In some embodiments, only a subset of nodes can be configured to transmit synchronization messages, for example, in order to reduce network congestion. In some embodiments, a subset of nodes can be designated or elected "master" nodes. For example, nodes that have access to an external power source can be elected as master nodes, whereas nodes that run on battery power may not. In various embodiments, nodes can be designated as one or more different types of master nodes including: discovery master nodes, synchronization master nodes, and/or anchor master nodes.

In some embodiments, one or more discovery master nodes can transmit NAN discovery messages, while other nodes may not. For example, discovery master nodes can be configured to transmit beacons outside of a discovery window. In some embodiments, one or more synchronization master nodes can transmit synchronization messages, while other nodes may not. For example, synchronization master nodes can be configured to transmit beacons within a discovery window.

In some embodiments, one or more anchor master nodes can be preferentially elected as synchronization master nodes and/or discovery master nodes. Anchor nodes can be preset, elected as described herein with respect to master node election, or determined in another manner. NANs having an anchor node can be referred to as anchored NANs and NANs having no anchor node can be referred to as non-anchored NANs.

FIG. 1 illustrates an example of a wireless communication system 100 in which aspects of the present disclosure may be employed. The wireless communication system 100 may operate pursuant to a wireless standard, such as an 802.11 standard. The wireless communication system 100 may include an AP 104, which communicates with STAs 106. In some aspects, the wireless communication system 100 may include more than one AP. Additionally, the STAs 106 may communicate with other STAs 106. As an example, a first STA 106a may communicate with a second STA 106b. As another example, a first STA 106a may communicate with a third STA 106c although this communication link is not illustrated in FIG. 1.

A variety of processes and methods may be used for transmissions in the wireless communication system 100 between the AP 104 and the STAs 106 and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs 106 and between an individual STA, such as the first STA 106a, and another individual STA, such as the second STA 106b or STA 106e. In some implementations the communications between STAs is in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs, such as during social-WiFi networking. Some possible communication links between STAs are illustrated in FIG. 1. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106. In some embodiments, the wireless communication system 100 may comprise a NAN.

Figure 2:
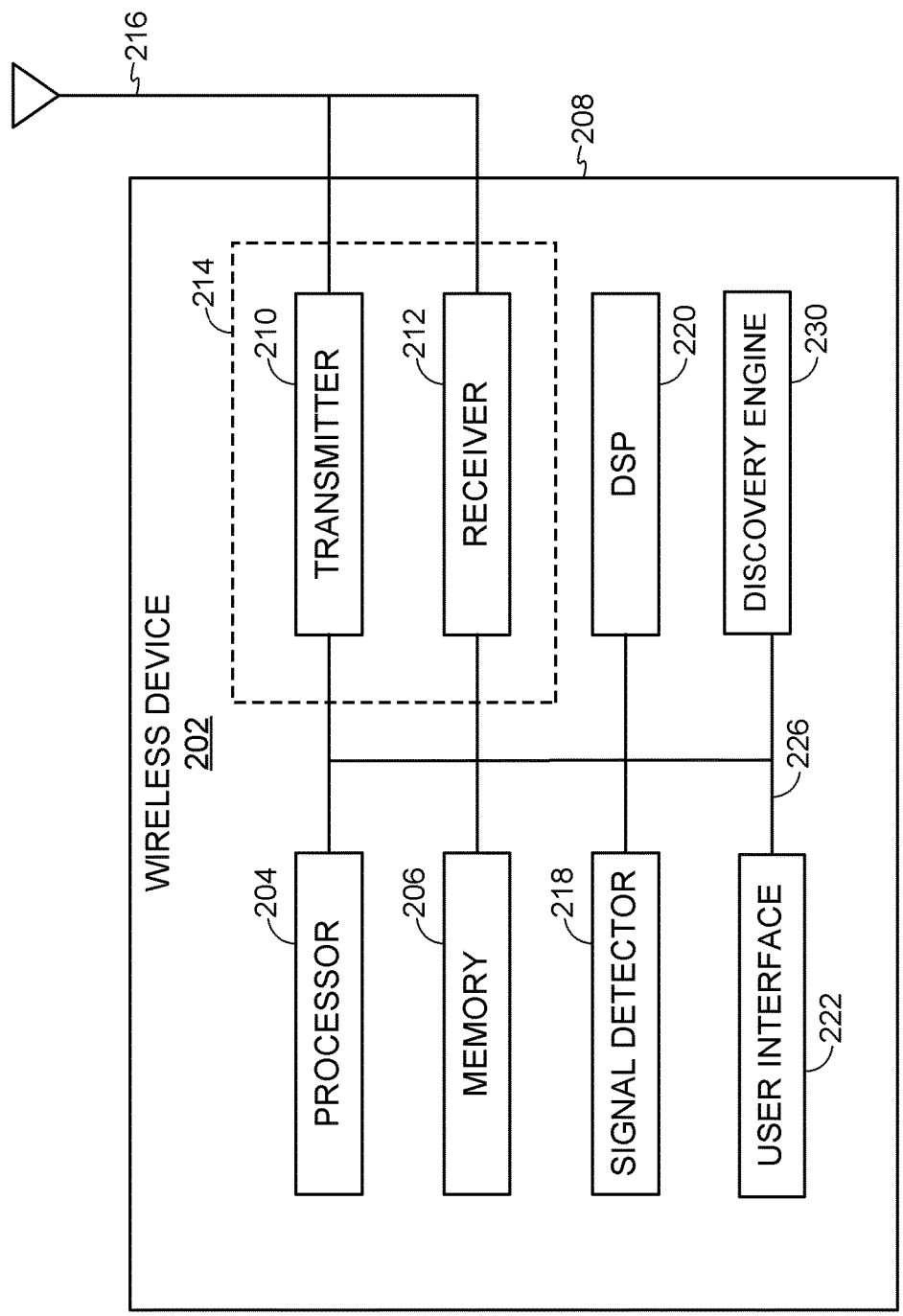
FIG. 2 illustrates a functional block diagram of a wireless device that can be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. The processor 204 may be configured to run applications, for example, social gaming applications or other applications that are facilitated by communications using a near-area network or neighborhood aware network (NAN).

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 may further comprise a discovery engine 230. One or more of the other components of device 202 may be coupled to and in communication with the discovery engine 230. In operation, the discovery engine 230 may provide information to an application running on the processor 204 (or device 202). This information may include a service identifier for identifying a service provided by the first device, an instance identifier for identifying an instance of a published service or an instance of a service on a specific device, and a requestor instance identifier for identifying an instance of a frame that triggered transmitting of the SDF or other action frame. An exemplary action frame is a NAN action frame (NAF). Subtypes of NAFs include Ranging Request, Ranging Response, Ranging Termination, Ranging Report, Data Path Request, Data Path Response, Data Path Confirm, Data Path Key Installment, Schedule Request, Schedule Response, Schedule Confirm, and Schedule Update Notification. The discovery engine 230 may be configured to use at least a portion of the information to facilitate communication for the application (or device 202), for example, communication with near-by devices or devices defined (and joined to) a near-area network (NAN).

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
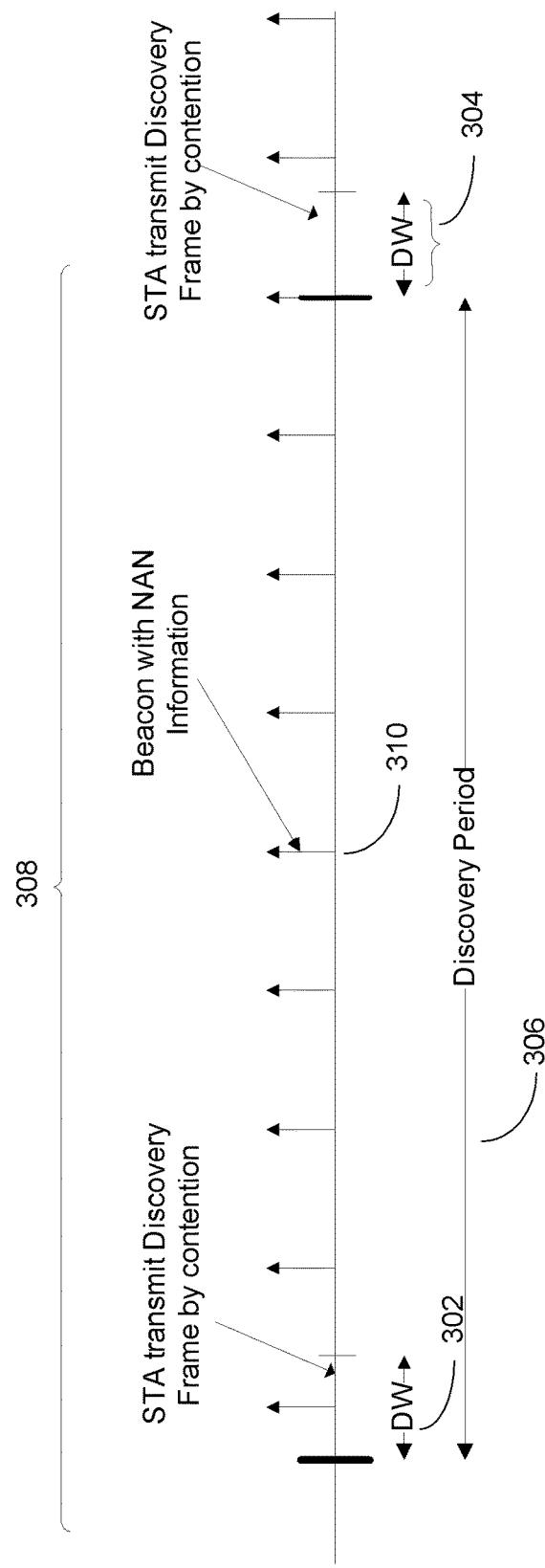
FIG. 3 illustrates an exemplary communication timeline in a wireless communication system in accordance with aspects of the present disclosure

FIG. 3 is an exemplary communication timeline in a wireless communication system that illustrates an exemplary discovery window structure for a STA to discover a NAN in accordance with exemplary implementations described herein. The exemplary discovery window structure 300 can include a discovery window (DW) 302 of time duration 304 and an overall discovery period (DP) 306 interval of time duration 308. The exemplary discovery window structure 300 may also include beacons 310 that include certain NAN information (e.g., time synchronization) sent from anchor or master STAs or nodes in the NAN. In some aspects, communications can occur via other channels as well. Time increases horizontally across the page over the time axis.

During the DW 302, STAs can advertise services through broadcast messages such as discovery packets or discovery frames. STAs can listen to broadcast messages transmitted by other STAs. In some aspects, the duration of DWs can vary over time. In other aspects, the duration of the DW can remain fixed over a period of time. The end of the DW 302 can be separated from the beginning of the subsequent DW by a first remainder period of time as illustrated in FIG. 3.

The overall interval of duration 308 can measure the period of time from the beginning of one DW to the beginning of a subsequent DW as illustrated in FIG. 3. In some embodiments, the duration 308 can be referred to as a discovery period (DP) 306. In some aspects, the duration of the overall interval can vary over time. In other aspects, the duration of the overall interval can remain constant over a period of time. At the conclusion of the overall interval of duration 308, another overall interval can begin, including a DW and the remainder interval. Consecutive overall intervals can follow indefinitely or continue for a fixed period of time. A STA can enter a sleep or power-save mode when the STA is not transmitting or listening or is not expecting to transmit or listen.

Discovery queries are transmitted during the DW 302. STA responses to the transmitted discovery queries are transmitted during the DP 306. As explained below, the allocated time for transmitting responses to the transmitted probe or discovery queries can, for example, overlap with the allocated time for transmitting the discovery queries, be adjacent to the allocated time for transmitting the discovery queries, or be at some time period after the end of the allocated time for transmitting the discovery queries.

Figure 4:
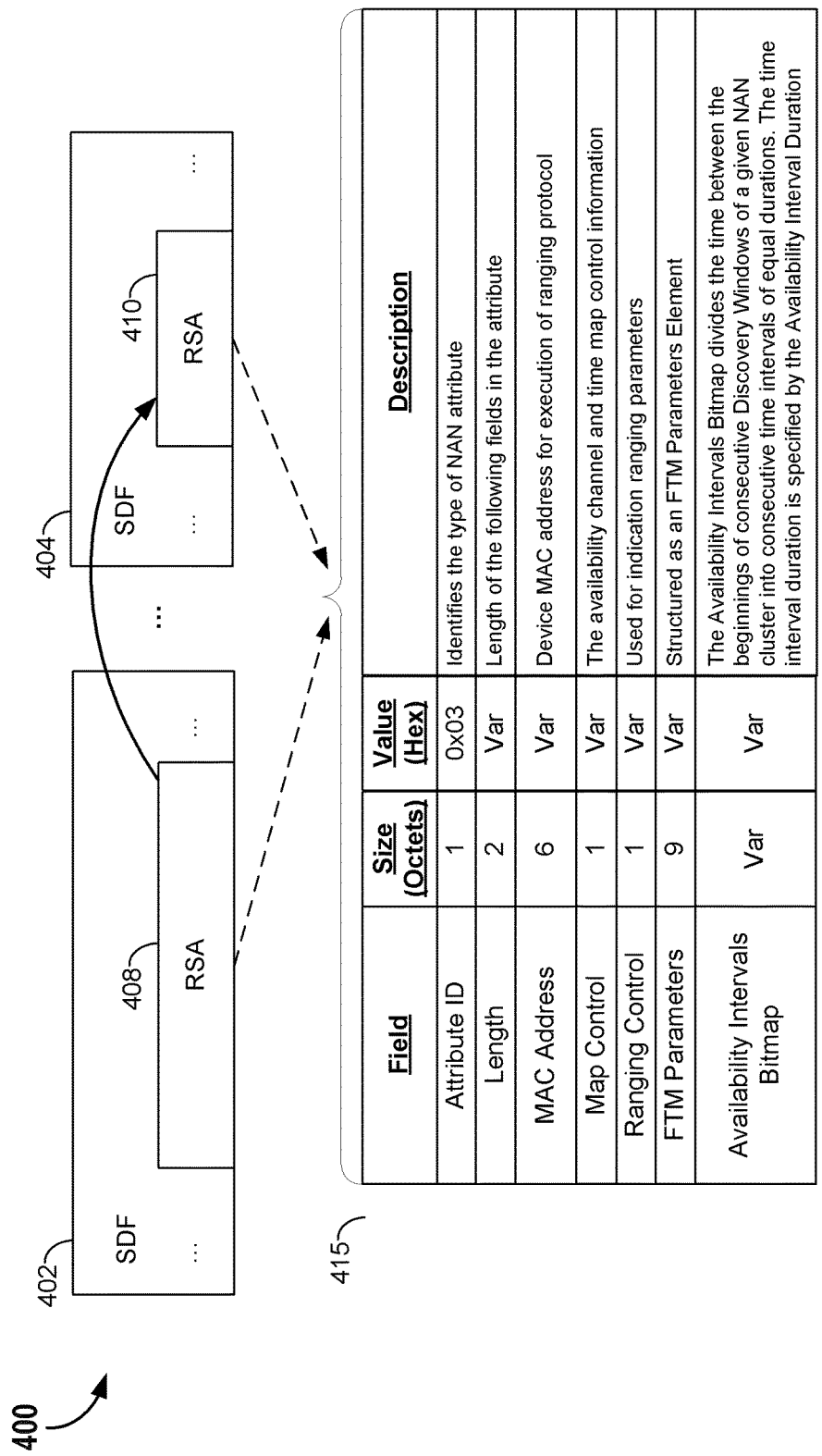
FIG. 4 illustrates an exemplary transmission of one or more service discovery frames (SDF) or other action frame, in accordance with an exemplary embodiment.

FIG. 4 illustrates an exemplary transmission 400 of one or more service discovery frames (SDF) or other action frame, in accordance with an exemplary embodiment. As illustrated, transmission 400 includes the transmission of SDF 402 and SDF 404. As described above, transmission 400 may be between (or among) devices within a NAN. In some aspects, SDF 402 and SDF 404 can be transmitted by a STA 106 during different discovery periods (DP) or the same DP, such as DP 306 of FIG. 3. As illustrated, SDF 402 comprises a ranging setup attribute (RSA) 408. Further, as illustrated, SDF 404 comprises RSA 410. SDFs 402 and 404 may comprise other information, such as other attributes, as described above, including additional RSAs for the same or other applications or services. In some aspects, the RSA 408 or 410 may indicate a protocol for determining a range between two devices.

Figure 5:
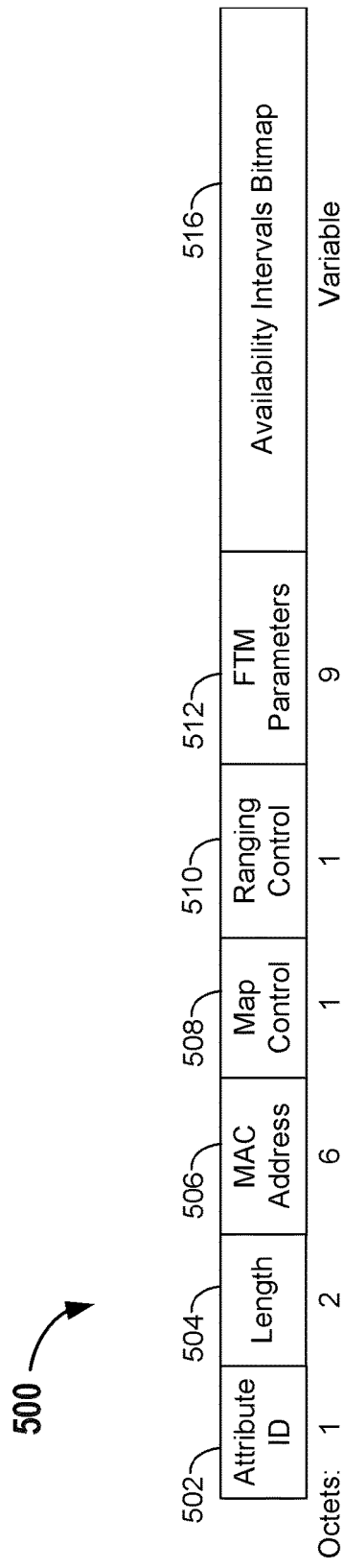
FIG. 5 illustrates an exemplary format of a ranging setup attribute (RSA), in accordance with an exemplary embodiment.

In some aspects, RSA 408 and 410 may be transmitted in accordance with the format illustrated in FIG. 5. FIG. 5 illustrates an exemplary format of a ranging setup attribute (RSA) 500, in accordance with an exemplary embodiment. As illustrated, RSA 500 comprises various fields, including attribute identifier field 502, length field 504, medium access control (MAC) address field 506, map control field 508, ranging control field 510, fine time measurement (FTM) parameters field 512, and an availability intervals bitmap field 516. RSA 500 may contain other fields not described herein. A discovery engine, such as discovery engine 230 of FIG. 2 may be utilized to obtain or determine the contents of the various fields of RSA 500 described herein. In connection with chart 415 of FIG. 4, the attribute identifier field 502 may be one octet in length, and can identify the type of NAN attribute. In one aspect, attribute identifier field 502 may indicate that the attribute is a ranging setup attribute or an RSA. Length field 504 may be two octets in length, and can indicate the length of the fields following in the attribute (e.g., RSA 500). The MAC address field 506 may be six octets in length, and can indicate a device MAC address for execution of ranging protocol. The map control field 508 may be one octet in length, and can contain an indication of an availability of a channel and time map control information.

Figure 6:
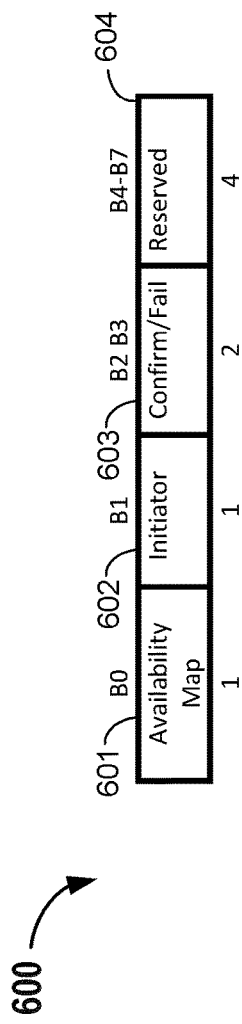
FIG. 6 shows an exemplary structure of a ranging control field of a RSA.

The ranging control field 510 may be one octet in length, and can indicate a variety of ranging parameters. For example, FIG. 6 illustrates an exemplary format of a ranging control field 600. As illustrated, ranging control field 600 comprises an availability map field 601, an initiator/responder field 602, a confirm/fail field 603, and a reserved field 604. In some aspects, the availability map field 601 may indicate whether an availability intervals bitmap is present, the initiator/responder field 602 may indicate whether the device sending the RSA comprising the ranging control field 600 is an initiator or a responder. For example, if a bit is set, it may indicate that the device is an initiator. In some aspects, the confirm/fail field 603 may indicate the status of the ranging protocol. For example, the confirm/fail field 603 may comprise two bits and a value of 00 may indicate that a negotiation process between two devices is process, a value of 01 may confirm that the negotiation was successful, a value of 10 may indicate that the negotiation failed, and a value of 11 may be reserved for future use. In some embodiments, the ranging control field 510 may comprise the format of ranging control field 600.

Figure 7:
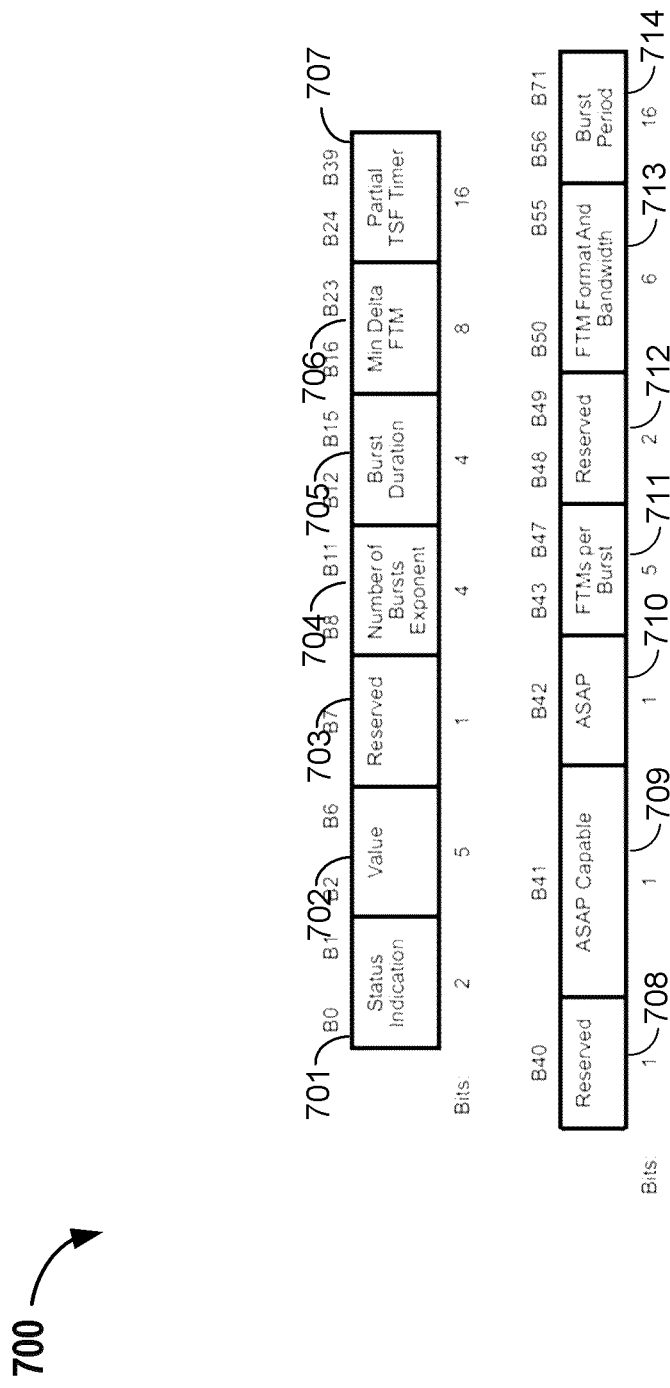
FIG. 7 shows an exemplary structure of a fine time measurement (FTM) parameters field of a RSA.

Referring back to FIG. 5, the fine time measurement (FTM) parameters field 512 may be 9 octets in length and can indicate a variety of FTM parameters. For example, FIG. 7 illustrates an exemplary format of a FTM parameters field 700. In some aspects, the FTM parameters field 700 may be structured as FTM parameters element. As shown, the FTM parameters field 700 comprises a status indication field 701, a value field 702, a reserved field 703, a number of bursts exponent field 704, a burst duration field 705, a minimum delta FTM field 706, a partial time synchronization function (TSF) timer field 707, a second reserved field 708, an as soon as possible (ASAP) capable field 709, an ASAP field 710, an FTMs per burst field 711, a third reserved field 712, an FTM format and bandwidth field 713, and a burst period field 714. In some embodiments, some of the fields of the FTM parameters field 700 may indicate the operation of the ranging protocol discussed herein. For example, in some aspects, the status indication field 701 may be set to 0 to indicate a device is an initiator and set to 1 to indicate the device is a responder, or vice versa. In this embodiment, the value field 702 may be set to 0, the number of bursts exponent field 704 may be set to 0, the ASAP capable field 709 may be set to 0 by the initiator and to 1 by the responder, the ASAP field 710 may be set to 1, and the burst period field 714 may be set to 0, to indicate the operation of the ranging protocol. The values set in these fields of the FTM may have certain advantages with respect to the ranging protocol. For example, an ASAP value set to 1 may be an efficient message in that it comprises a single initial FTM request (iFTMR) message followed by a measurement. The number of bursts exponent field set to 0 indicates a single burst configuration which does not require coordination of a burst period. Additionally, the values may allow the ranging protocol to fit within the NAN paradigm where a schedule is derived from NAN timing and an existing protocol is executed in a time block provided by the NAN. The protocol may also allow for use of an existing FTM mode without any modification. Other fields of the FTM parameters field 700 may be set according to their functionality as pre-defined or as defined in an IEEE-based standard.

In some embodiments, the FTM parameters field 512 may be reduced to 3 octets in length and includes various FTM parameters. FIG. 8 shows a chart 800 illustrating the different fields of a RSA (e.g., RSAs 408 and 410) including their size, value, and a brief description. Chart 800 is similar to and adapted from chart 415 of FIG. 4 and only differences between chart 415 and chart 800 are described herein for sake of brevity. In chart 800, the FTM parameters field 512 has a size of 3 octets as opposed to the 9 octets indicated in chart 415. FIG. 9 illustrates an exemplary format of a FTM parameters field 900. As shown, the FTM parameters field 900 comprises a burst duration field 905, a minimum delta FTM field 906, an FTMs per burst field 911, an FTM format and bandwidth field 913, and a reserved field 915. In some embodiments, some of the fields of the FTM parameters field 900 may indicate the operation of the ranging protocol discussed herein. In some aspects, the fields of the FTM parameters field 900 are according to the same named fields of FTM parameters field 700 to indicate the ranging protocol. In some aspects, the burst duration field 905 (and 705) indicates a maximum time of a burst, the minimum delta FTM field 906 (and 706) indicates a time between two FTM frames for measurements in a burst, the FTMs per burst field 911 (and 711) indicates a number of measurement frames sent in a burst, and the FTM format and bandwidth field 913 indicates a physical (PHY) layer frame type and a bandwidth for a FTM measurement frame.

In some embodiments, the ranging control field 510 size may be increased to 2 octets in length to carry additional information. FIG. 10 shows a chart 1000 illustrating the different fields of a RSA (e.g., RSAs 408 and 410) including their size, value, and a brief description. Chart 1000 is similar to and adapted from chart 800 of FIG. 8 and only differences between chart 800 and chart 1000 are described herein for sake of brevity. In chart 1000, the ranging control field 510 has a size of 2 octets as opposed to the 1 octet indicated in chart 800. As shown in chart 1000, the RSA 408 of FIG. 4 may also comprise a service map field 1015 and a last move indication field 1020. The service map field 1015 has a size of 1 octet. When the service map field 1015 is present, it may be used to indicate the nth bit is set, which indicates that ranging is mandatory of the service in the nth service discovery attribute (SDA) listed in the service discovery frame (SDF). When the service map field 1015 is not present, its absence can indicate that device requests ranging is independent of the services (e.g., without any service). The last move indication field 1020 may have a size of 2 octets and may be used to indicate a value of a cluster time synchronization function (TSF) at the last detected platform movement. This last move indication field 1020 may be present if the last move indication present field 1104 of FIG. 11 (discussed below) is set to 1.

Figure 11:
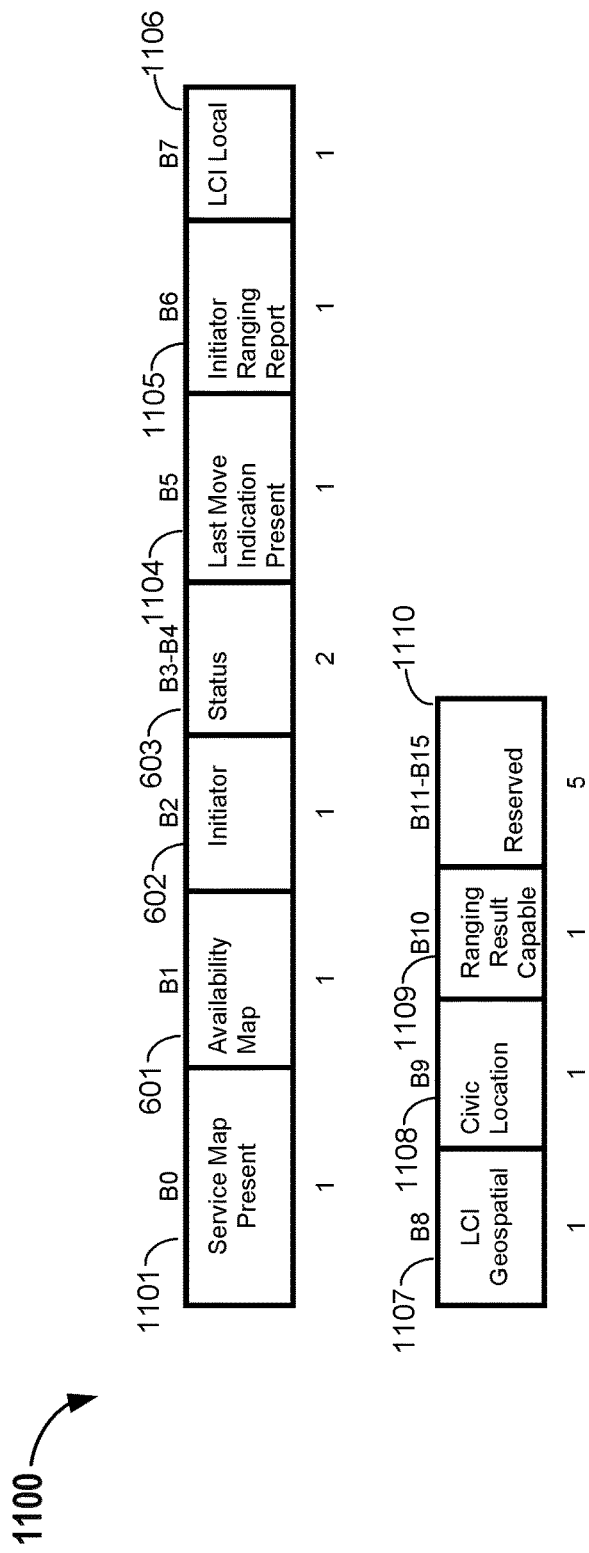
FIG. 11 illustrates another exemplary structure of a ranging control field of a RSA.

FIG. 11 illustrates an exemplary format of a ranging control field 1100. Ranging control field 1100 is similar to and adapted from ranging control field 600 of FIG. 6 and only differences between ranging control field 600 and ranging control field 1100 are described herein for sake of brevity. As shown, the ranging control field 1100 comprises a service map present field 1101, a last move indication present field 1104, an initiator ranging report field 1105, a location connectivity information (LCI) local field 1106, a LCI geospatial field 1107, a civic location field 1108, a ranging result capable field 1109, and a reserved field 1110. In some embodiments, the service map present field 1101 may comprise one bit and indicates whether the service map field 1015 is present. In some embodiments, the last move indication present field 1104 may comprise one bit and indicates whether the last move indication field 1020 is present. In some embodiments, the initiator ranging report field 1105 may comprise one bit and if the initiator ranging report field 1105 is set to 1 by the FTM responder, indicates the ranging results are requested by the responder. If the initiator ranging report field 1105 is set to 1 by the FTM initiator, the ranging results will be transmitted to the responder upon completion of the each FTM session (i.e. each single block). In some aspects, the LCI local field 1106 may comprise one bit and indicates whether a STA has local coordinates available (LCI local coordinates). In some aspects, the LCI geospatial field 1107 may comprise one bit and indicates whether a STA has a geospatial location available (Geospatial LCI WGS84). In some aspects, the civic location field 1108 may comprise one bit and indicates whether a STA has a Civic location capable (Civic Location). In some aspects, the ranging result capable field 1109 may comprise one bit and indicates whether the device is capable of providing a ranging result or range to other devices. In some aspects, the reserve field 1110 may comprise five bits.

Figures 12A, 12B:
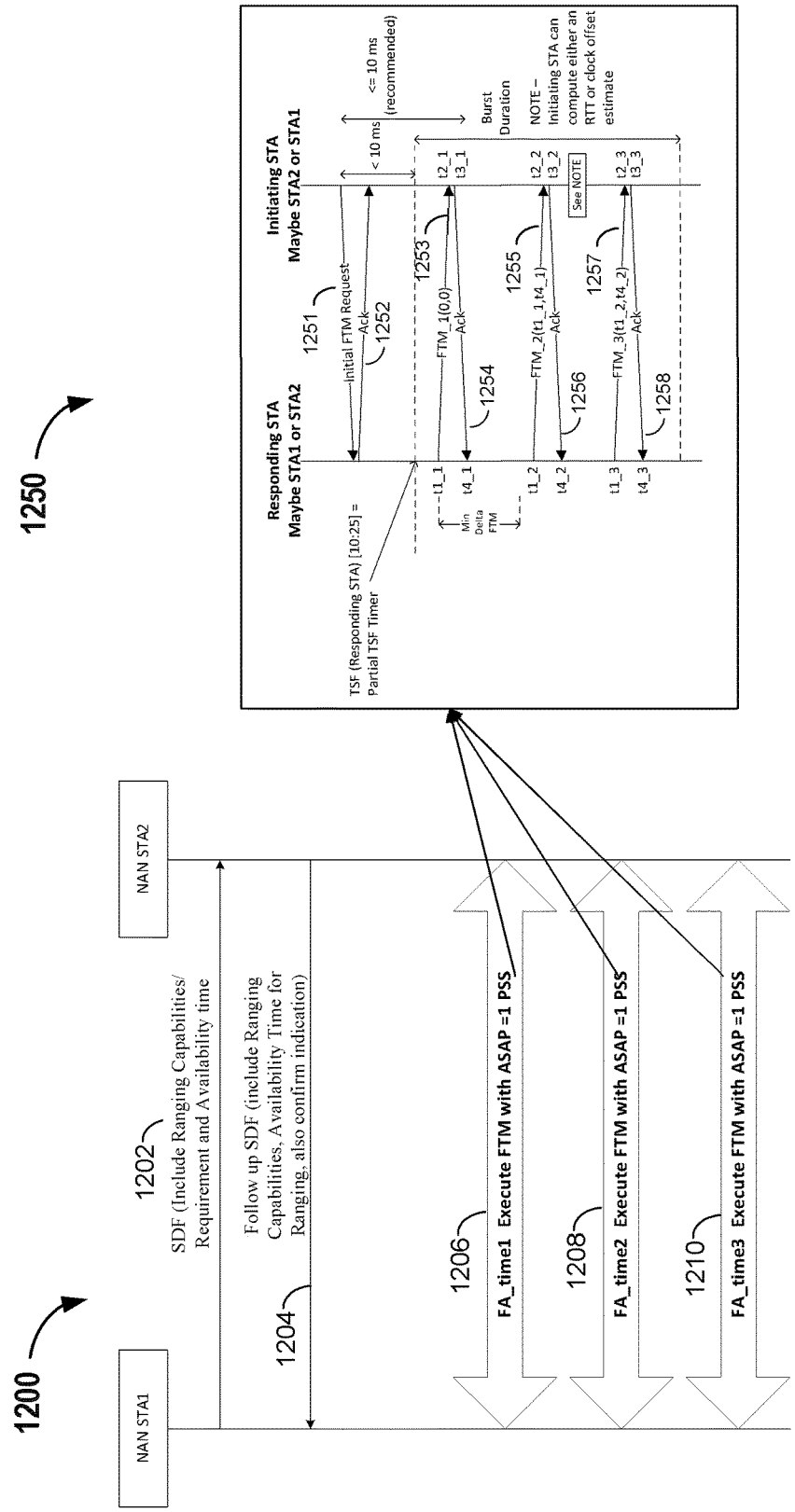
FIG. 12A is an exemplary call flow illustrating a ranging protocol in a neighbor aware network (NAN).
FIG. 12B is an exemplary call flow illustrating a FTM protocol in a NAN.

FIG. 12A illustrates an exemplary call flow 1200 implementing a ranging protocol in accordance with embodiments described herein. In FIG. 12A NAN STA1 and NAN STA2 exchange various communications to determine a range between the two devices. In some aspects, during a discovery window (e.g., DW 302 of FIG. 3) of a discover period (e.g., DP 306), NAN STA1 transmits a service discovery frame (SDF) 1202 (e.g., SDF 402) to NAN STA2. In some aspects, NAN STA1 may transmit SDF 1202 during a further in service discovery window. The SDF 1202 comprises ranging capabilities/requirements, availability time, and/or bandwidth information. For example, the SDF 1202 may comprise an RSA (e.g., RSA 408) which indicates a protocol for determining a range between two devices. The RSA may comprise a ranging control field (e.g., ranging control field 510, 600) and a FTM parameters field (e.g., FTM parameters field 512, 700, and/or 900) for including ranging information regarding the ranging protocol as described above.

For example, in connection with FIGS. 4-6 the configuration of the ranging control field of the SDF 1202 may be as follows: the availability map field 601 indicates the availability intervals bitmap is present (e.g., set to 1), the initiator/responder field 602 indicates the NAN STA1 is the initiator (e.g., set to 1), and the confirm/fail field 603 indicates that the negotiation between NAN STA1 and NAN STA2 is in process (e.g., set to 00). The availability intervals bitmap field 516 would indicate a time period or timeslot within the NAN DP (e.g., DP 306) and outside the DW (e.g., DW 302) for the devices to initiate an FTM protocol for ranging. Additionally, and in connection with FIGS. 4 and 7, the FTM format and bandwidth field 713 of the FTM parameters field of the SDF 1202 may indicate the bandwidth for performing the FTM protocol. The FTM parameters field of the SDF 1202 may also include other parameters as discussed above. In some aspects, the SDF 1202 may be transmitted as a broadcast message.

In response to the SDF 1202, the NAN STA2 may transmit an SDF 1204. The SDF 1204 may include a selection of the same availability time, ranging capabilities/requirements, and/or bandwidth as indicated in the SDF 1202 or it may include a selection of one or more different parameters. The SDF 1204 may also include a confirmation indicating that the reception of the SDF 1202 and/or confirming the indicated parameters in the SDF 1202 (e.g., indicated ranging information and indicated time period). In some embodiments, the ranging FTM protocol occurs during a time period or timeslot indicated in the availability intervals bitmap field 516 included in the SDF 1204 or SDF 1202. In some aspects, the responding STA in the DW (e.g., NAN STA2) becomes the initiating STA during the ranging FTM protocol that occurs during the NAN DP. As shown in FIG. 12A, the ranging FTM protocol measurements 1206, 1208, 1210 occur at multiple times during a NAN DP. In some embodiments, the ranging FTM protocol may comprise the FTM defined in an 802.11-based standard.

FIG. 12B illustrates an exemplary call flow 1250 implementing a fine timing measurement (FTM) protocol, in accordance with embodiments described herein. In some aspects, the ranging FTM protocol measurements 1206, 1208, 1210 comprises the call flow 1250. In some embodiments, the exemplary call flow 1250 occurs during the time period indicated in the availability intervals bitmap field 516 included in the SDF 1202 and/or SDF 1204. As shown, the initiating STA (e.g., NAN STA2 of FIG. 12A) sends an initial FTM request (iFTMR) message 1251 to the responding STA (e.g., NAN STA1 of FIG. 12A). In response, the responding STA transmits an acknowledgment (ACK) message 1252 to the initiating STA. The responding STA may then initiate FTM and send as series of FTM measurements. The number of measurements, the time between measurements, the duration for the measurements, and other FTM parameters may be defined in the FTM parameters field 512, 700, or 900, as described above. As shown in FIG. 12B, the STAs exchange a total of 3 FTM/ACK message exchanges (e.g., messages 1253-1258). In some embodiments, FTM protocol measurement 1206 corresponds to messages 1253 and 1254, FTM protocol measurement 1208 corresponds to messages 1255 and 1256, and FTM protocol measurement 1206 corresponds to messages 1257 and 1258. Based on the messages exchanged in call flow 1250, the initiating STA can compute either a round trip time (RTT) or a clock offset estimate to determine a range between initiating STA and the responding STA.

Figure 13:
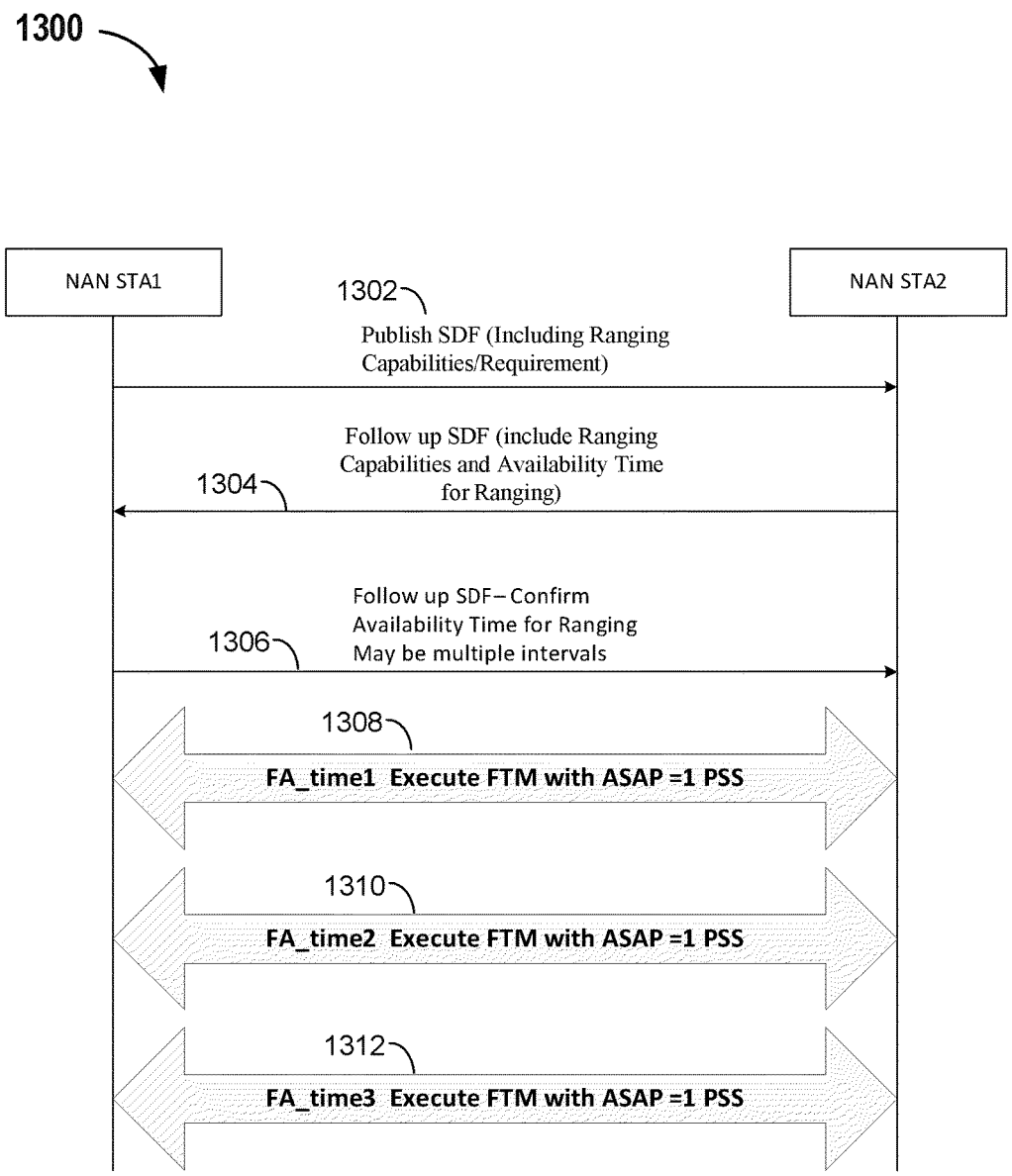
FIG. 13 is another exemplary call flow illustrating a ranging protocol in a NAN.

FIG. 13 illustrates an exemplary call flow 1300 implementing a ranging protocol in accordance with embodiments described herein. In FIG. 13 NAN STA1 and NAN STA2 exchange various communications to determine a range between the two devices. In some aspects, during a discovery window (e.g., DW 302 of FIG. 3) of a discovery period (e.g., DP 306), NAN STA1 transmits a service discovery frame (SDF) 1302 (e.g., SDF 402) to NAN STA2. In some aspects, NAN STA1 may transmit SDF 1302 during a further in service discovery window. The SDF 1302 comprises ranging capabilities/requirements and/or bandwidth information. For example, the SDF 1302 may comprise a ranging setup attribute (RSA) (e.g., RSA 408) which indicates a protocol for determining a range between two devices. The RSA may comprise a ranging control field (e.g., ranging control field 510, 600) and a FTM parameters field (e.g., FTM parameters field 512, 700, and/or 900) for including information regarding the ranging protocol as described above.

In response to the SDF 1302, the NAN STA2 may transmit an SDF 1304. The SDF 1304 may include an availability time for ranging, ranging capabilities/requirements, and/or bandwidth as indicated in the SDF 1302 or it may include a selection of one or more different parameters. The SDF 1304 may also include a confirmation indicating that the reception of the SDF 1302 and/or confirming the indicated parameters in the SDF 1302. In some embodiments, the ranging FTM protocol occurs during a timeslot indicated in the availability intervals bitmap field 516 included in the SDF 1304. The NAN STA1 then transmits a SDF 1306 confirming the availability time for ranging indicated in the SDF 1304. In some aspects, the availability times in SDF 1306 comprise a subset of availability times indicated in the SDF 1304.

FIG. 13 also shows FTM protocol measurements 1308, 1310, 1312 that occur during the NAN DP outside of the DWs. In some aspects, the responding STA in the DW (e.g., NAN STA2) becomes the initiating STA during the ranging FTM protocol that occurs during the NAN DP. As shown in FIG. 13, the ranging FTM protocol measurements 1308, 1310, 1312 occur at multiple times during a NAN DP. In some embodiments, the ranging FTM protocol may comprise the FTM defined in an 802.11-based standard. In some aspects, the ranging FTM protocol measurements 1308, 1310, 1312 comprise the same call flow and exchange of messages as ranging FTM protocol measurements 1206, 1208, 1210 (e.g., messages 1253-1258) illustrated in FIGS. 12A and 12B.

Figure 14:
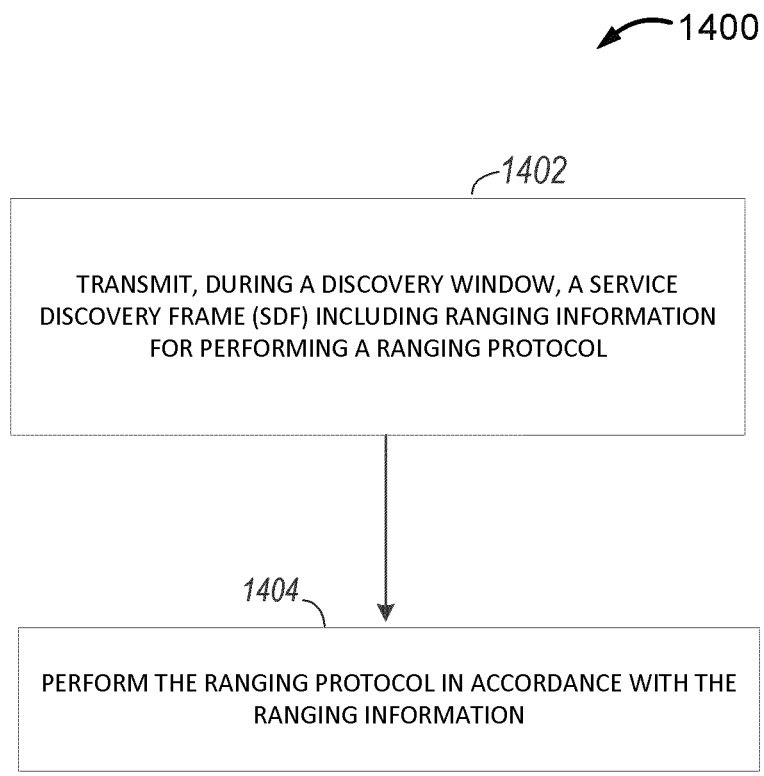
FIG. 14 is a flowchart of an exemplary method for wireless communication in a NAN.

FIG. 14 shows a flowchart 1400 of a method wireless communication in accordance with an embodiment described herein. The method can be implemented in whole or in part by the devices described herein, such as the wireless device 202 shown in FIG. 2 or any of the STAs 106a-106d shown in FIG. 1. Although the illustrated method is described herein with reference to the wireless communication system 100 discussed above with respect to FIG. 1, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added. Moreover, although the method of flowchart 1400 is described herein with respect to service discovery frames, the method can be applied to any type of NAN frame including, for example, synchronization beacons and cluster discovery beacons.

First, at block 1402, an apparatus (e.g., NAN STA1 of FIG. 12A) transmits a service discovery frame (SDF 1202) during a discovery window. The SDF may include ranging information and an indication of a time period outside the discovery window for performing a ranging protocol in accordance with the ranging information. Next, at block 1404, the apparatus performs the ranging protocol during the time period indicated in the SDF.

In some embodiments, an apparatus may perform the functions of method 1400. The apparatus may comprise means for generating a service discovery frame (SDF 1202) or other action frame. The SDF may include ranging capabilities/requirements, availability time, and/or bandwidth information. In some aspects, the means for generating may be implemented by the processor 204, the DSP 220, or the discovery engine 230 of FIG. 2. The apparatus may further comprise means for transmitting the SDF. In certain embodiments, the means for transmitting can be implemented by the transceiver 214 (FIG. 2) or by the transmitter 210 (FIG. 2). The apparatus may further comprise means for performing a ranging protocol during an availability time indicated in the SDF. In certain embodiments, the means for performing can be implemented by the processor 204, the DSP 220, the discovery engine 230, transceiver 214, the transmitter 210, and/or the receiver 212 of FIG. 2. In some embodiments, the ranging protocol may comprise an FTM protocol defined in an 802.11-based standard. In some aspects, the ranging protocol may comprise the call flow 1050 of FIG. 10B.

Figure 15:
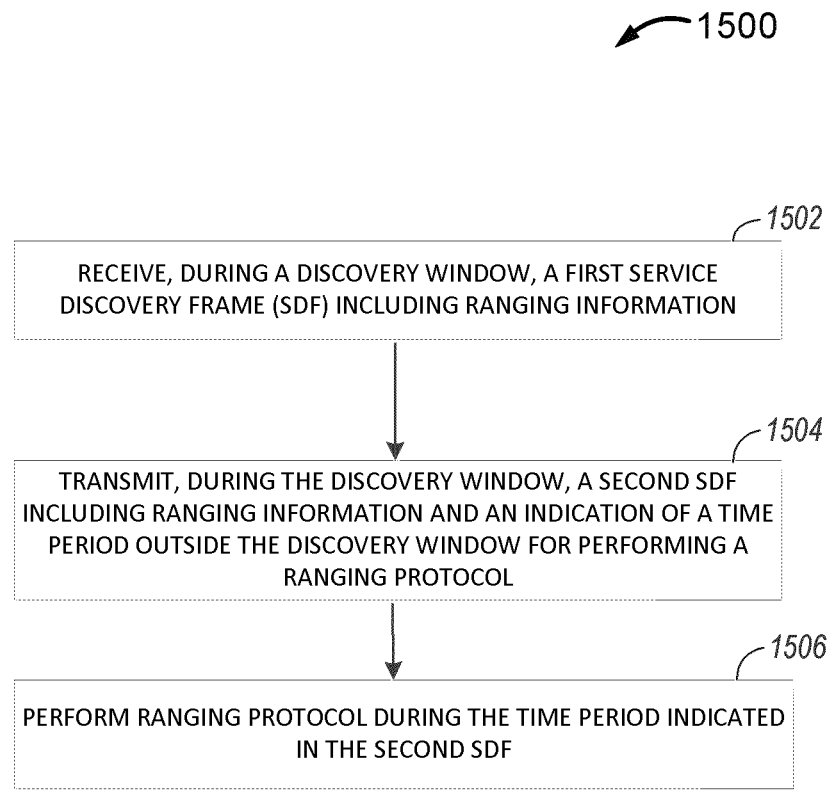
FIG. 15 is a flowchart of another exemplary method for wireless communication in a NAN.

FIG. 15 shows a flowchart 1500 of a method wireless communication in accordance with an embodiment described herein. The method can be implemented in whole or in part by the devices described herein, such as the wireless device 202 shown in FIG. 2 or any of the STAs 106a-106d shown in FIG. 1. Although the illustrated method is described herein with reference to the wireless communication system 100 discussed above with respect to FIG. 1, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added. Moreover, although the method of flowchart 1400 is described herein with respect to service discovery frames, the method can be applied to any type of NAN frame including, for example, synchronization beacons and cluster discovery beacons.

First, at block 1502, an apparatus (e.g., NAN STA2 of FIG. 12A) receives a first service discovery frame (SDF 1202) or other action frame during a discovery window. The first SDF may include ranging information. Next, at block 1504, the apparatus transmits a second SDF in response to the first SDF during the discovery window. The second SDF may include ranging information and an indication of a time period outside the discovery window for performing a ranging protocol in accordance with the ranging information. Then, at block 1506, the apparatus performs the ranging protocol during the time period indicated in the second SDF.

In some embodiments, an apparatus may perform the functions of method 1500. The apparatus may comprise means for receiving a first service discovery frame (SDF 1002). The SDF or other action frame may include ranging capabilities/requirements, availability time, and/or bandwidth information. In some aspects, the means for receiving may be implemented by the transceiver 214 and/or the receiver 212 of FIG. 2. The apparatus may further comprise means for transmitting a second SDF. The second SDF may include ranging capabilities/requirements, availability time, and/or bandwidth information. In certain embodiments, the means for transmitting can be implemented by the transceiver 214 (FIG. 2) or by the transmitter 210 (FIG. 2). The apparatus may further comprise means for performing a ranging protocol during an availability time indicated in the SDF. In certain embodiments, the means for performing can be implemented by the processor 204, the DSP 220, the discovery engine 230, transceiver 214, the transmitter 210, and/or the receiver 212 of FIG. 2.

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element can precede the second element in some manner. Also, unless stated otherwise a set of elements can include one or more elements.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-15 can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication in a neighbor aware network (NAN), comprising:
 transmitting during a discovery window, by a first device, a first service discovery frame (SDF) or other action frame to a second device, the first SDF or other action frame comprising at least one attribute that includes ranging information, an indication of a time period outside the discovery window for performing a ranging protocol for determining a range between the first device and the second device, a ranging control field for indicating ranging parameters, a fine time measurement (FTM) parameters field for indicating FTM parameters, and a last move indication present field for indicating whether a last move indication field is present, the ranging control field including a reserved field, a service map present field for indicating whether a service map field is present, and an initiator ranging report field for indicating whether ranging results are requested by a responder device or will be transmitted to the responder device; and performing the ranging protocol, by the first device, in accordance with the ranging information during the time period indicated in the first SDF or other action frame.

2. The method of claim 1, wherein the at least one attribute comprises a medium access control (MAC) address field for identifying a MAC address of a device performing the ranging protocol, a map control field for indicating an availability of a channel and of map control information, and an availability intervals bitmap field for indicating the time period.

3. The method of claim 2, wherein the at least one attribute further comprises a service map field and a last move indication field.

4. The method of claim 3, wherein the service map field indicates whether ranging is required for a service attribute in the first SDF or other action frame.

5. The method of claim 4, wherein indicating whether ranging is required comprises setting a bit in the service map field such that a bit position of the bit indicates a position of the service attribute for which ranging is required.

6. The method of claim 2, wherein the ranging control field comprises an availability map field, an initiator/responder field, and a confirm/fail field.

7. The method of claim 6, wherein the availability map field indicates whether the availability intervals bitmap field is present.

8. The method of claim 7, wherein the initiator/responder field indicates whether the first device is an initiator or a responder.

9. The method of claim 7, wherein the confirm/fail field indicates whether a ranging protocol is in process, is successful or fails.

10. The method of claim 6, wherein the ranging control field further comprises a ranging result capable field.

11. The method of claim 1, wherein performing the ranging protocol comprises performing the ranging protocol without any service when the service map field is not present.

12. The method of claim 10, wherein the ranging result capable field indicates whether the first device is capable of providing a ranging result to other devices.

13. The method of claim 2, wherein the FTM parameters field comprises a burst duration field, a minimum delta FTM field, a FTMs per burst field, and a FTM format and bandwidth field.

14. The method of claim 1, wherein the ranging protocol comprises a fine time measurement (FTM) protocol.

15. The method of claim 1, further comprising receiving a second SDF in response to the first SDF or other action frame, the second SDF or other action frame including ranging information and an indication of a time period outside the discovery window for performing a ranging protocol in accordance with the ranging information of the second SDF or other action frame.

16. The method of claim 15, wherein the time period of the second SDF or other action frame is different than the time period in the first SDF or other action frame.

17. The method of claim 15, wherein the ranging information of the second SDF or other action frame is different than the ranging information in the first SDF or other action frame.

18. The method of claim 15, wherein the second SDF or other action frame further comprises a confirmation of the ranging information and the indicated time period in the first SDF or other action frame.

19. The method of claim 1, wherein the at least one attribute comprises a ranging setup attribute.

20. A method of wireless communication in a neighbor aware network (NAN), comprising:

receiving during a discovery window, at a first device, a first service discovery frame (SDF) or other action frame from a second device, the first SDF or other action frame comprising ranging information;

transmitting during the discovery window, by the first device, a second SDF or other action frame to the first device in response to the first SDF or other action frame, the second SDF or other action frame comprising at least one attribute that includes ranging information, an indication of a time period outside the discovery window for performing a ranging protocol for determining a range between the first device and the second device in accordance with the ranging information, a ranging control field for indicating ranging parameters, a fine time measurement (FTM) parameters field for indicating FTM parameters, and a last move indication present field for indicating whether a last move indication field is present, the ranging control field including a reserved field, a service map present field for indicating whether a service map field is present, and an initiator ranging report field for indicating whether ranging results are requested by a responder device or will be transmitted to the responder device; and performing the ranging protocol, by the first device, during the time period indicated in the second SDF or other action frame.

21. The method of claim 20, wherein the first SDF or other action frame comprises an attribute that includes the ranging information.

22. The method of claim 20, wherein the at least one attribute comprises a medium access control (MAC) address field for identifying a MAC address of a device performing the ranging protocol, a map control field for indicating an availability of a channel and of map control information, and an availability intervals bitmap field for indicating the time period.

23. The method of claim 22, wherein the ranging control field comprises an availability map field, an initiator field, and a confirm/fail field.

24. The method of claim 22, wherein the availability map field indicates whether the availability intervals bitmap field is present.

25. The method of claim 22, wherein the initiator field indicates whether the first device is an initiator or a responder.

26. The method of claim 22, wherein the confirm/fail field indicates whether a ranging protocol is in process, is successful or fails.

27. The method of claim 21, wherein the FTM parameters field comprises a burst duration field, a minimum delta FTM field, a FTMs per burst field, and a FTM format and bandwidth field.

28. The method of claim 20, wherein the ranging protocol comprises a fine time measurement (FTM) protocol.

29. The method of claim 20, further comprising receiving a third SDF or other action frame in response to the second SDF or other action frame, the third SDF or other action frame including ranging information and an indication of a second time period outside the discovery window for performing a ranging protocol in accordance with the ranging information of the third SDF or other action frame.

30. The method of claim 29, wherein the second time period of the third SDF or other action frame is different than the time period in the second SDF or other action frame.

31. The method of claim 29, wherein the ranging information of the third SDF or other action frame is different than the ranging information in the second SDF or other action frame.

32. The method of claim 29, wherein the third SDF or other action frame further comprises a confirmation of the ranging information and the indicated time period in the second SDF or other action frame.

33. The method of claim 20, wherein the at least one attribute comprises a ranging setup attribute.

34. An apparatus configured to wirelessly communicate, comprising:
a transmitter configured to transmit during a discovery window, a first service discovery frame (SDF) or other action frame to a second device, the first SDF or other action frame comprising at least one attribute that includes ranging information, an indication of a time period outside the discovery window for performing a ranging protocol for determining a range between the first device and the second device, a ranging control field for indicating ranging parameters, a fine time measurement (FTM) parameters field for indicating FTM parameters, and a last move indication present field for indicating whether a last move indication field is present, the ranging control field including a reserved field, a service map present field for indicating whether a service map field is present, and an initiator ranging report field for indicating whether ranging results are requested by a responder device or will be transmitted to the responder device; and
a processor configured to perform the ranging protocol in accordance with the ranging information during the time period indicated in the first SDF or other action frame.

35. An apparatus configured to wirelessly communicate, comprising:
a receiver configured to receive during a discovery window, a first service discovery frame (SDF) or other action frame from a second device, the first SDF or other action frame comprising ranging information;
a transmitter configured to transmit during the discovery window, a second service discovery frame (SDF) or other action frame to the second device, the second SDF or other action frame comprising at least one attribute that includes ranging information an indication of a time period outside the discovery window for performing a ranging protocol for determining a range between the first device and the second device in accordance with the ranging information, a ranging control field for indicating ranging parameters, a fine time measurement (FTM) parameters field for indicating FTM parameters, and a last move indication present field for indicating whether a last move indication field is present, the ranging control field including a reserved field, a service map present field for indicating whether a service map field is present, and an initiator ranging report field for indicating whether ranging results are requested by a responder device or will be transmitted to the responder device; and
a processor configured to perform the ranging protocol during the time period indicated in the second SDF or other action frame.

36. An apparatus for wireless communication, comprising:
means for transmitting during a discovery window, by a first device, a first service discovery frame (SDF) or other action frame to a second device, the first SDF or other action frame comprising at least one attribute that includes ranging information, an indication of a time period outside the discovery window for performing a ranging protocol for determining a range between the first device and the second device, a ranging control field for indicating ranging parameters, a fine time measurement (FTM) parameters field for indicating FTM parameters, and a last move indication present field for indicating whether a last move indication field is present, the ranging control field including a reserved field, a service map present field for indicating whether a service map field is present, and an initiator ranging report field for indicating whether ranging results are requested by a responder device or will be transmitted to the responder device; and
means for performing the ranging protocol, by the first device, in accordance with the ranging information during the time period indicated in the first SDF or other action frame.

37. An apparatus for wireless communication, comprising:
means for receiving during a discovery window, at a first device, a first service discovery frame (SDF) or other action frame from a second device, the first SDF or other action frame comprising ranging information;
means for transmitting during a discovery window, by the first device, a second service discovery frame (SDF) or other action frame to the second device, the second SDF or other action frame comprising at least one attribute that includes ranging information an indication of a time period outside the discovery window for performing a ranging protocol for determining a range between the first device and the second device, a ranging control field for indicating ranging parameters, a fine time measurement (FTM) parameters field for indicating FTM parameters, and a last move indication present field for indicating whether a last move indication field is present, the ranging control field including a reserved field, a service map present field for indicating whether a service map field is present, and an initiator ranging report field for indicating whether ranging results are requested by a responder device or will be transmitted to the responder device; and
means for performing the ranging protocol, by the first device, during the time period indicated in the second SDF or other action frame.

38. A non-transitory computer-readable medium comprising code that, when executed, causes an apparatus to perform a method, the method comprising:
transmitting during a discovery window, by a first device, a first service discovery frame (SDF) or other action frame to a second device, the first SDF or other action frame comprising at least one attribute that includes ranging information, an indication of a time period outside the discovery window for performing a ranging protocol for determining a range between the first device and the second device, a ranging control field for indicating ranging parameters, a fine time measurement (FTM) parameters field for indicating FTM parameters, and a last move indication present field for indicating whether a last move indication field is present, the ranging control field including a reserved field, a service map present field for indicating whether a service map field is present, and an initiator ranging report field for indicating whether ranging results are requested by a responder device or will be transmitted to the responder device; and performing the ranging protocol, by the first device, in accordance with the ranging information during the time period indicated in the first SDF or other action frame.

39. A non-transitory computer-readable medium comprising code that, when executed, causes an apparatus to perform a method, the method comprising:

receiving during a discovery window, at a first device, a first service discovery frame (SDF) or other action frame from a second device, the first SDF or other action frame comprising ranging information;

transmitting during the discovery window, by the first device, a second service discovery frame (SDF) or other action frame to the second device, the second SDF or other action frame comprising at least one attribute that includes ranging information, an indication of a time period outside the discovery window for performing a ranging protocol for determining a range between the first device and the second device, a ranging control field for indicating ranging parameters, a fine time measurement (FTM) parameters field for indicating FTM parameters, and a last move indication present field for indicating whether a last move indication field is present, the ranging control field including a reserved field, a service map present field for indicating whether a service map field is present, and an initiator ranging report field for indicating whether ranging results are requested by a responder device or will be transmitted to the responder device; and performing the ranging protocol, by the first device, during the time period indicated in the second SDF or other action frame.

* * * * *